US011451656B2

(12) United States Patent
Kwatra et al.

(10) Patent No.: US 11,451,656 B2
(45) Date of Patent: Sep. 20, 2022

(54) INTELLIGENT NOTIFICATION MODE SWITCHING IN USER EQUIPMENT

(71) Applicant: INTERNATIONAL BUSINESS MACHINES CORPORATION, Armonk, NY (US)

(72) Inventors: Shikhar Kwatra, Morrisville, NC (US); Sarbajit K. Rakshit, Kolkata (IN); Komminist Weldemariam, Nairobi (KE); Paul Krystek, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 673 days.

(21) Appl. No.: 16/054,741

(22) Filed: Aug. 3, 2018

(65) Prior Publication Data

US 2020/0045164 A1 Feb. 6, 2020

(51) Int. Cl.
*H04M 1/725* (2021.01)
*H04W 4/021* (2018.01)
*H04M 1/72463* (2021.01)
*G06N 20/00* (2019.01)

(52) U.S. Cl.
CPC ........ *H04M 1/72463* (2021.01); *G06N 20/00* (2019.01); *H04W 4/021* (2013.01)

(58) Field of Classification Search
CPC .. H04M 1/72463; G06N 20/00; H04W 4/021; H04W 4/02
See application file for complete search history.

(56) References Cited

U.S. PATENT DOCUMENTS

| | | | |
|---|---|---|---|
| 9,749,467 B1* | 8/2017 | Hertzfeld | H04M 3/436 |
| 2014/0113581 A1* | 4/2014 | Nassimi | H04M 3/42153 455/404.1 |
| 2016/0005050 A1* | 1/2016 | Teman | G06F 16/583 705/317 |
| 2016/0227379 A1* | 8/2016 | Arastafar | H04W 4/029 |
| 2016/0255188 A1* | 9/2016 | Chaudhri | H04M 1/72451 715/728 |
| 2016/0373573 A1 | 12/2016 | Bivens et al. | |
| 2017/0099382 A1* | 4/2017 | Cardonha | H04W 4/08 |
| 2017/0289954 A1* | 10/2017 | Mese | H04W 4/021 |
| 2018/0243157 A1* | 8/2018 | Takada | A61H 3/061 |

* cited by examiner

*Primary Examiner* — Minjung Kim
(74) *Attorney, Agent, or Firm* — Griffiths & Seaton PLLC

(57) ABSTRACT

Embodiments for intelligent notification mode switching in user equipment (UE) by a processor. Data may be received from one or more UEs associated with one or more users. Electronic communication switching factors associated with the one or more users may be identified. An implication of a switching notification mode on the one or more UEs based on the electronic communication switching factors may be learned. An electronic communication modes of the one or more UEs associated with the one or more users may be cognitively switched according to the learned implication.

20 Claims, 6 Drawing Sheets

INTELLIGENT NOTIFICATION MODE SWITCHING IN USER EQUIPMENT

BACKGROUND OF THE INVENTION

Field of the Invention

The present invention relates in general to computing systems, and more particularly to, various embodiments for providing intelligent and automatic notification mode switching in user equipment (UE) by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between consumers, businesspersons, educators, and others.

SUMMARY OF THE INVENTION

Various embodiments for intelligent notification mode switching in user equipment (UE) by a processor are provided. In one embodiment, by way of example only, a method for cognitively and automatically switching notification modes in mobile devices in an Internet of Things (IoT) computing environment, again by a processor, is provided. Data may be received from one or more UEs associated with one or more users. Electronic communication switching factors associated with the one or more users may be identified. An implication of a switching notification mode on the one or more UEs based on the electronic communication switching factors may be learned. An electronic communication modes of the one or more UEs associated with the one or more users may be cognitively switched according to the learned implication.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
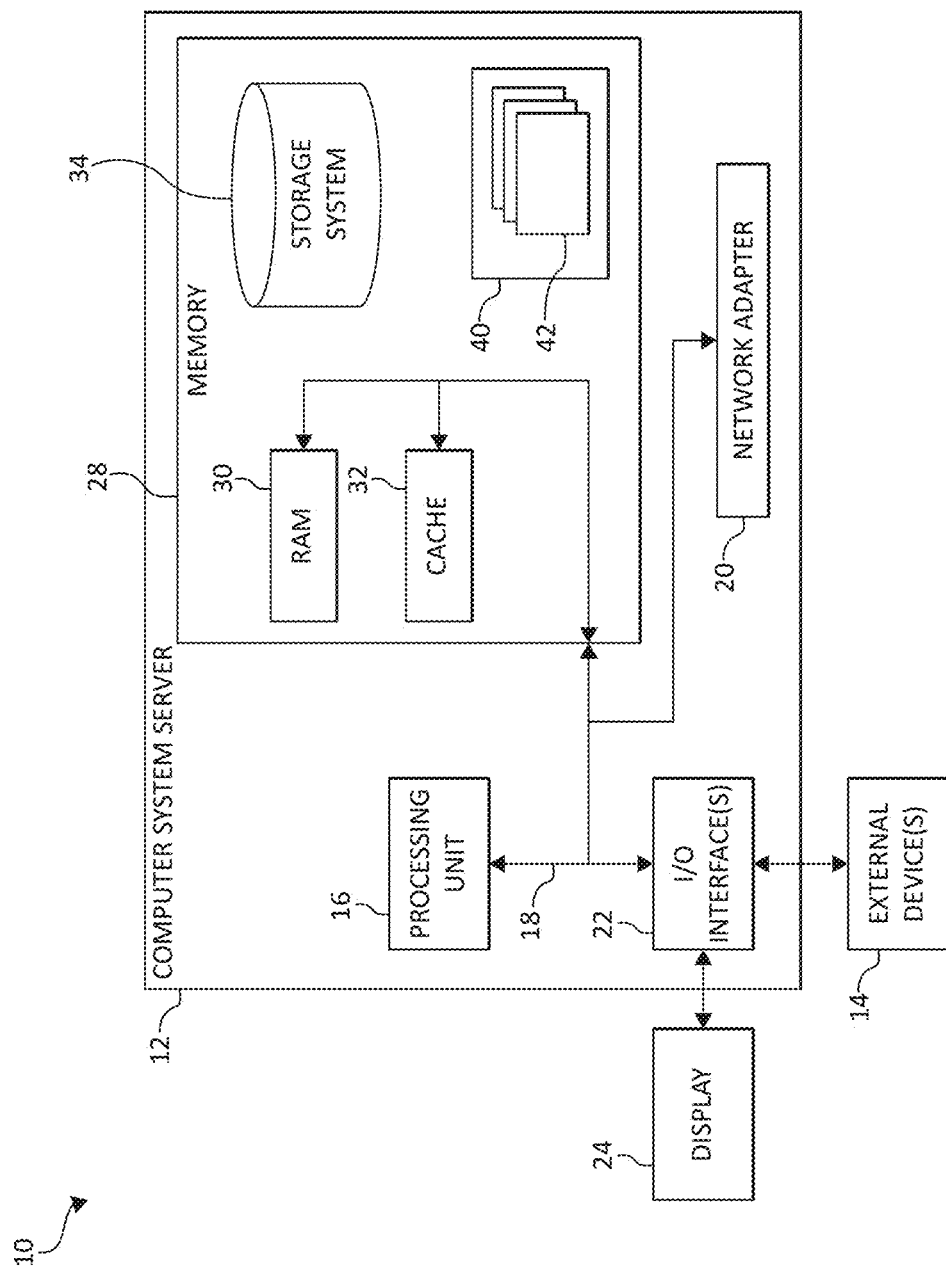
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

With the increased advances in user of computing devices (aka "user equipment") such as, for example, wireless communication devices (e.g., IoT devices, smart phones, tablets, computers), each user equipment may have one or more notification modes (e.g., a silent notification mode, an audible notification mode, a vibration mode, an airplane mode). However, many times these users fail to switch these UEs to the appropriate notification (e.g., turn the notification mode to airplane mode upon entering an aircraft) and/or users may forget to remove or switch back to a desired notification (e.g., returning from silent mode to audible notification mode after the conclusion of a conference call, exiting the airport, or leaving a theater, etc.). As such, users may often miss important communication messages such as, for example, telephone calls, emails, texts, alerts, alarms, if the UE is not in the appropriate notification mode. Thus, a need exits for intelligent notification mode switching for one or more UEs associated with a user based on various parameters, preferences, polices, and/or events.

Accordingly, the present invention provides for cognitively and automatically switching notification modes in mobile devices in an Internet of Things (IoT) computing environment, again by a processor, is provided. One or more parameters, events, and contextual information associated with a user may be cognitively learned and prioritized. A notification mode of one or more UEs associated with the user may be automatically switched according to the learning and prioritizing. Additionally, the notification mode of one or more UEs associated with the user may be automatically controlled, adjusted, switched, or a combination thereof according to the learning and prioritizing.

In one aspect, data may be received from one or more UEs associated with one or more users. Electronic communication switching factors (e.g., parameters, events, and contextual information associated with a user that may be cognitively learned and prioritized) associated with the one or more users may be identified. An implication of a switching notification mode on the one or more UEs based on the electronic communication switching factors may be learned. In one aspect, the implications may include, for example, a user missing important call, meetings, messages, alarm (if the phone is to be set on silent or off mode), or other implications relating to the switching notification mode and/or one or more contextual factors associated with the UE and/or user. An electronic communication modes of the one or more UEs associated with the one or more users may be cognitively switched according to the learned implication.

In one aspect, the present invention provides for a cognitive system for intelligent prioritization on conglomeration of multiple parameters and/or events including, for example, calendar meetings, video/audio chat sessions, real-time monitoring of audio and/or video calls and messages, location-based dependencies (e.g., entering or exiting a meeting room or building). Also, the UE may be capable of switching notification modes and or controlling the UE automatically.

A confidence level may be established based on user priority and a categorization of the parameters and/or events such as, for example, various calls, meetings, and/or location. The device may cognitively and/or automatically switch modes (e.g., silent mode, sleep mode, vibration mode, airplane mode) based on user's preference.

In one aspect, the cognitive notification switching may also be performed according to the user's metadata such as, for examples, metadata based on how a user converses with a particular person. For example, the present invention may detect a person calling to a UE (e.g., smart phone, tablet, computer, telephone, etc.) of the user during an important meeting, convention, session, or other type of event or setting. The present invention may detect a capability of the UE and may determine whether a call is to be rejected and/or accepted during the prioritized meeting, convention, session, or other type of event or setting (e.g., accepting only calls defined or indicated as approvable for interrupting the type of event or setting such as, for example, a child's school calling during the day to a parent, a nursing home of a loved one calling, or other type of rated calls). The present invention may learn the historical interactions of the user with the electronic communications and actions taken by the user to determine switching of notification modes as well as controlling a UE. This information may be provided to the user (e.g., audio, visual, text, etc.) when a determination is made that the notification mode is switched. In this way, a user may be informed as to why the notification mode has changed such as, for example, the important and expected call came in and accepted based on an issue that had to be addressed before 5 pm (e.g., a doctor calling with diagnosis results, and/or recommendations).

In one aspect, mechanisms of the illustrated embodiment may interrupt the mobile device so as to poll a main computer processor unit ("CPU") inside the mobile device to disrupt the silent mode, the sleep mode, the vibration mode, and/or the airplane mode and switch the notification mode in case of any emergency situation. Moreover, the notification mode may be automatically switched between different notification modes, along with providing the reasons why the notification mode changed.

Additionally, when a notification mode switches to an alternative notification mode (e.g., for events, settings, or circumstances defined, ranked, indicated, or selected as eligible for switching). The notification mode may switch back to the previous notification mode and/or may remain in the new notification mode based on user preference or priority settings. Upon receiving a critical call or notification (e.g., prioritized call/notification), the present invention may provide the user with an option, via an interactive graphical user interface ("GUI") (e.g., a selection button), to push or transfer the communication (e.g., a call, message, email, etc.) to an alternative mobile device or transfer/redirect the electronic communication to a secondary user. A set of user-defined preferences may be configured in a user profile to be used for managing the pushing and/or transferring of the electronic communication.

Thus, mechanisms of the illustrated embodiments may include a user preference profile to identify one or more approved devices for cognitively switching notification modes and/or affecting other mobile devices modes of communication at the time of a critical communication. For example, a user preference profile may include a list of approved UEs such as, for example, a first smart phone, a second smart phone, and laptop computer, each of which may be approved for implementing the cognitive notification mode switching. For example, the first smart phone may be a personal mobile device and the second smart phone is a business phone. In this example, the user profile may indicate that if any telephone calls are received on the first smart phone from a child's school, the calls may be transferred from the first smart phone to the second smart phone. The second smart phone may then cognitively switch the notification mode from a silent mode (even during a scheduled meeting) to an audible notification mode so as to immediate alert the user of the incoming telephone call as provided by the user preferences.

Due to the various situations and degree of importance of the communications types being monitored, a machine learning operation may identify the context or setting of events, feedback, user behavior, historical data, communication patterns, preference, calendar data so as to cognitively and automatically switch the notification mode. For example, the present invention may learn when to automatically switch to an active mode. Alternatively, the present invention may cognitively switch, according to the learning, a notification mode from a silent mode to an active mode upon completion of a scheduled event (e.g., a calendared meeting).

Also, a monitoring operation may be performed on one or more parameters, events, and contextual information associated with the user and the one or more UEs. Based upon the monitoring, the present invention may interrupt the current notification mode (e.g., an audible notification mode or "ringer mode") of the UE and cognitively switch to an alternative notification mode (e.g., a silent mode). Thus, for example, if a meeting attended by the user has completed, the UE may automatically switch from silent mode to ringer mode so that the user (who might have failed to manually switch the silent notification mode back to ringer mode) is able to receive the communication (e.g., telephone call or text message) based on one or more defined priority levels or preferences of the user. The priority levels or preference may depend on a degree of importance relating to the communication, a location, scheduled meetings, and/or type of event or settings. The priority levels and user preference may be defined by a user in settings/preferences of the user profile and/or learned according to a machine learning operation. Moreover, historical data or interaction or behavior pattern of the user's preferences may be learned and identified for cognitively and automatically switching between different notification modes.

In addition, one or more sensors (e.g., IoT sensors) may be employed such as, for example, those sensors located on the UE, and/or one or more remote sensors in communication with the UE for cognitively switching the notification modes. Media data such as, for example, images, video, and/or sounds may be analyzed to automatically change to an appropriate or defined notification mode on the UE based on surrounding context. The surrounding context can be identified from biometric signals from surrounding people, camera feedback, contextual analysis of camera feed, or one or more sensor data of the surrounding. A history of locations can be used to create a historical profile using analytics to predict a best or most appropriate notification mode when entering a given space or defined location (e.g., using global positioning satellite data or video analysis from camera etc.). A user may define or set one or more user preferences to use the cognitive learning of the locations in relation to notification switching, which may include only using the cognitive notification switching for only select, defined, or learned locations approved for the switching.

For example, if a user enters into a bedroom of a child, the UE may identify and learn that a child is sleeping in the bedroom, so the UE may cognitively and automatically switch from the ringer mode (e.g., audible tone/alert notification) to the silent mode or vibrate mode to avoid causing a loud, audible ring tone, which may hamper or disturb sleep of the child when user enters into the bedroom. In this example, data of the child (which may be captured from sensors, monitors, and/or cameras) may be used to learn and identify the child is sleeping.

In an alternative example, assume that a student is studying in a room where any ring tone may create a disturbance to the environment of the student. Accordingly, the UE may cognitively and automatically switch from the audible notification mode to a silent or vibration notification mode during the duration of the studying. Alternatively, the present invention may automatically adjust the loudness of the audible notification.

In a third example, if a group of persons are watching movie in a dark room or theater, any bright display on a screen of the UE cause by receiving a phone call may create disturbance to the collocated viewers. Thus, the present invention may cognitively and automatically switch the display mode to a reduced light display (e.g., switching to a night mode or minimized screen back lights). Also, the display mode may be turned off, reduced, or minimized for eliminating and/or dimming lights and switch to a vibration mode that may be used as a notification of the incoming call.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
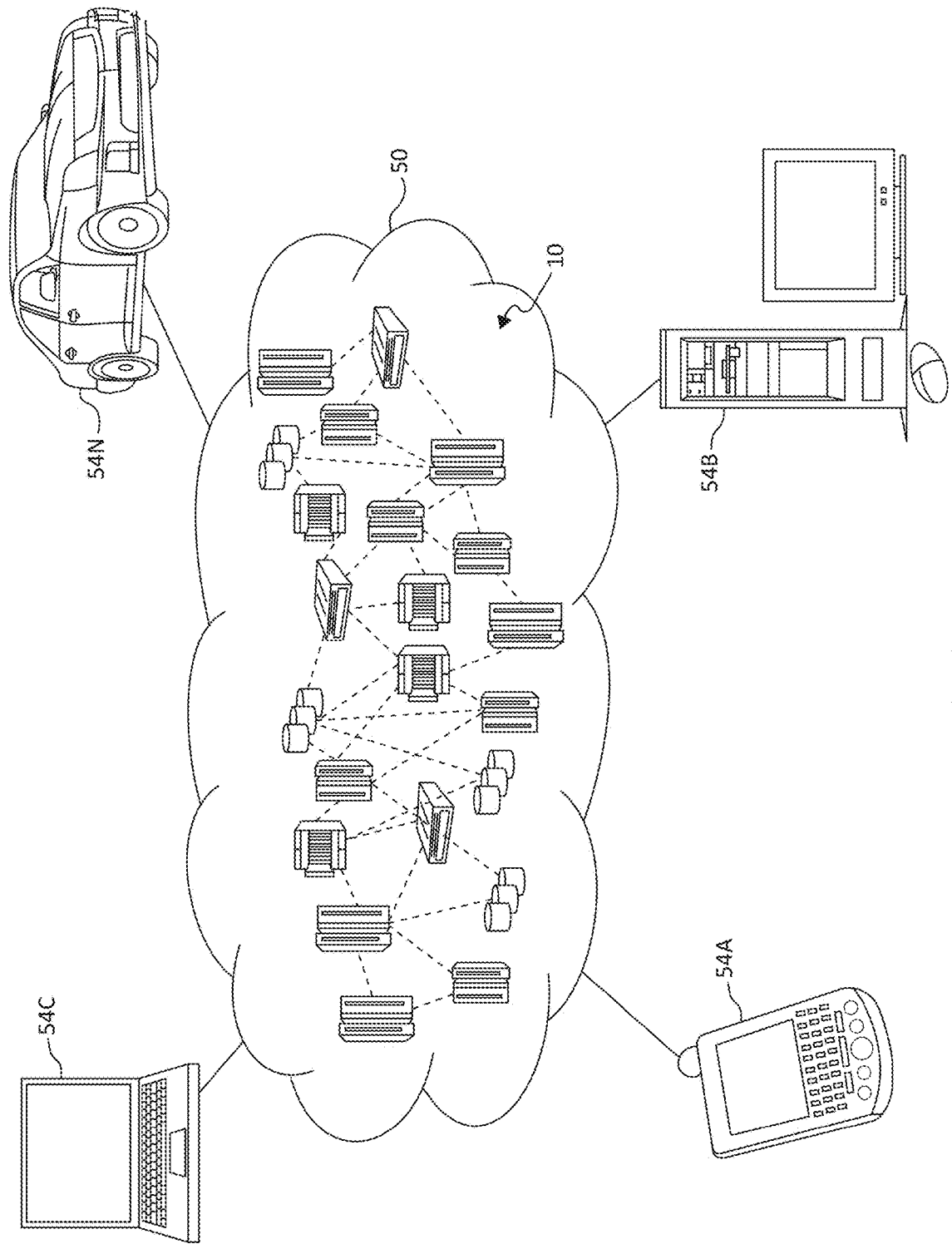
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
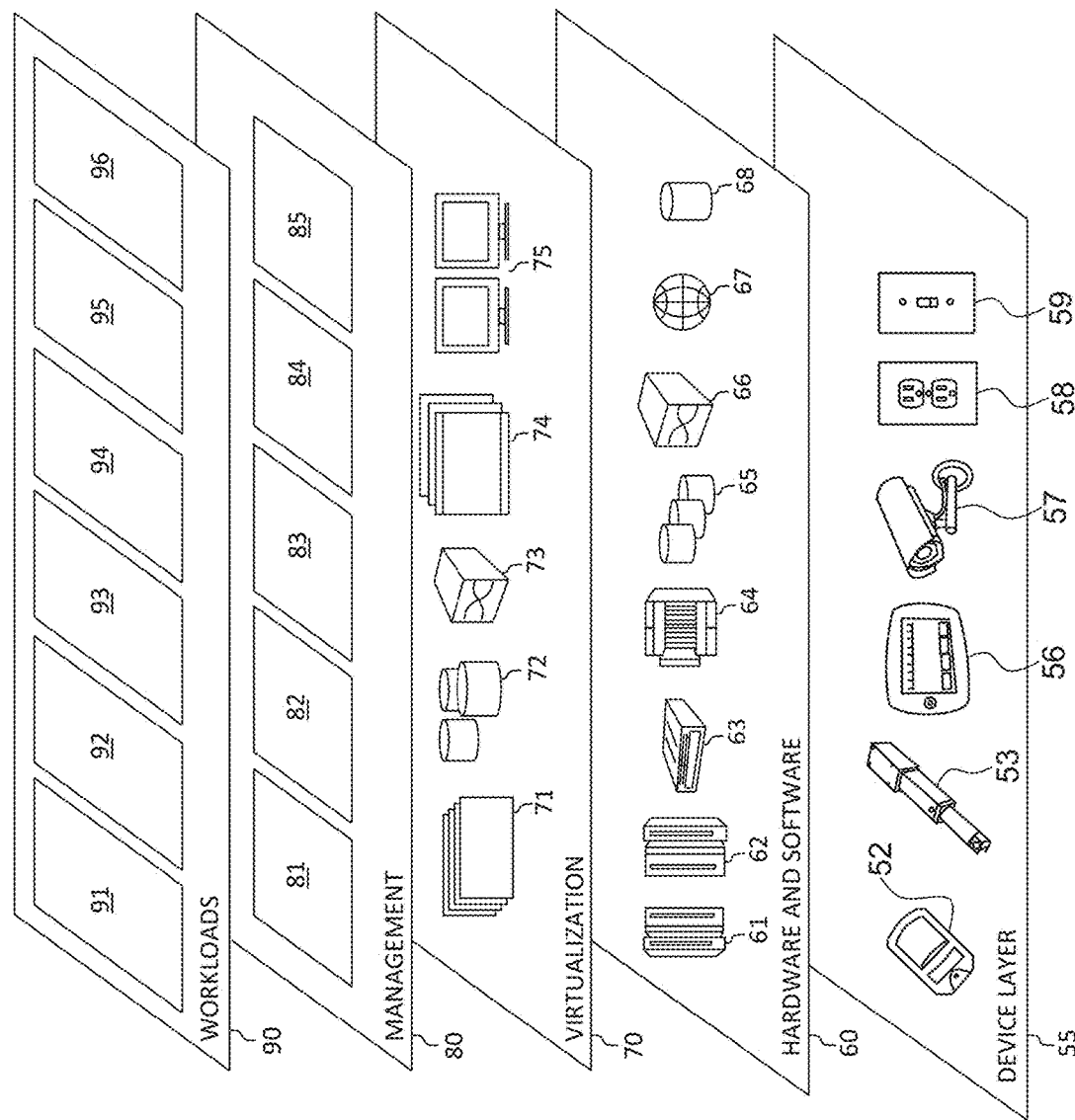
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent temporary contact sharing between UEs. In addition, workloads and functions 96 for intelligent temporary contact sharing between UEs may include such operations as data analytics, data analysis, and as will be further described, notification functionality. One of ordinary skill in the art will appreciate that the workloads and functions 96 for intelligent temporary contact sharing between UEs may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously indicated, a mobile device may be triggered to join a temporary cluster of networked mobile devices in an internet of things (IoT) computing environment. The temporary cluster of networked mobile devices may be a sub-network of a larger, general network. That is, the temporary cluster of networked mobile devices may comprise of only those mobile devices enabled to join the temporary cluster of networked mobile devices.

In one aspect, one or more mobile devices may be triggered for performing an information exchange. In one aspect, the triggering of the mobile device for information exchange may be triggered by one or more of the mobile devices tapping on each other of the one or more mobile devices. In an alternative aspect, instead of tapping each of the mobile devices together with NFC and sharing contacts instantly in each other's mobile devices, each of the mobile devices may be linked together to connect each of the mobile devices to create the temporary cluster of linked mobile devices (e.g., an ad-hoc network) in a cloud computing system/database (if the users tend to have one) for temporarily sharing and storing the user contact information. The user can connect to, turn on, and/or join this "adhoc network" for the user's mobile device to immediately share contacts or user contact information with those who have also connected to, turned on, and/or joined the ad-hoc network.

The one or more mobile devices (e.g., each of the temporary cluster of networked mobile devices) may be NFC enabled to perform a bidirectional exchange of information. A bidirectional exchange of contact information may be provided (or performed) between the mobile device and one or more of the temporary cluster of networked mobile devices. A temporary list of contacts may be defined and created according to the bidirectional exchange of information. Also, one or more contacts may be added to, deleted from, and/or updated in the temporary list of contacts while the one or more of the mobile devices are associated with the temporary cluster of networked mobile devices according to one or more policies, one or more user preferences, the historical data, a defined physical or virtual proximity between each of the one or more mobile device.

The contact information may be located in one or more of the mobile devices and may be retained while the temporary cluster of networked mobile devices remains within a defined distance from one another. That is, as long as the one or more mobile devices associated with the temporary cluster of networked mobile devices remains in a defined distance or defined location/region (e.g., building, city, community, or defined radius from a selected location) from the temporary cluster of networked mobile devices the contact information may be retained in one or more of the mobile devices.

A determination operation may be performed to determine if one or more of the mobile devices have traveled or moved to a location outside the defined distance or the defined location/region (e.g., a smart phone leaving a vacation destination or a computing tablet moving outside a defined radius such as, for example, 5 miles). If the mobile device has traveled or moved to a location outside the defined distance or the defined location/region, the contact information may be automatically deleted from the mobile device upon expiration of a predetermined time period. If the mobile device has traveled or moved to a location outside the defined distance or the defined location/region, the bidirectional exchange of contact information may be terminated and any of the temporary contact information may be deleted. In one aspect, each mobile device may be provided a delayed query asking the user to either retain the contact/group of contacts and make the contact/group of contacts part of the permanent storage.

In one aspect, the temporarily stored contact information may remain in storage of the one or more mobile devices while the temporary cluster of networked mobile devices remains within a selected distance from one another. A timer (e.g., a built-in timer) may be used and set to automatically delete the contact and/or list of contacts from the temporary storage following expiration of the set time. That is, the timer is triggered to start if the one or more mobile devices move to a location outside the selected distance (e.g., moved away from the temporary cluster of networked mobile devices). For example, the timer may be set as having a default time period (e.g., default of 2 days). In an additional aspect, the NFC mobile devices (or a mobile device operating system) can initially trigger the timer to count a selected duration and return back to sleep (e.g., enter a sleep mode) by running in the back-end of a mobile device or system associated with the mobile device. The sleep timer may then trigger the automatic deletion of the phone contacts list after a span of 2 days has been completed. The triggering of the automatic deletion implies accessing the contact list and deleting the specific list of contacts once the configurable time period is completed or expired.

Upon determining the one or more mobile devices has moved to a location outside the selected distance, the timer is triggered and starts counting the selected or default time period. Upon expiration of the selected or default time period, the temporary contact information and/or list of contacts may be deleted. It should also be noted that if a mobile device such as, for example, mobile device "A" moves to the location outside the selected distance, the contact information of mobile device "A" may be deleted, retained, or altered in alternative mobile devices that are associated with the temporary cluster of networked mobile devices. One or more of the alternative mobile devices may be alerted or notified that the mobile device such as, for example, mobile device "A" has moved to a location outside the selected distance. One or more of the alternative mobile devices may cognitively or dynamically delete the contact information of mobile device "A" according to user preferences, policies, parameters, rules, or learned behavior of the user in relation to each individual alternative mobile devices. For example, a first alternative mobile device may dynamically delete the contact information of mobile device "A" based on a user preference associated with the first alternative mobile device. Alternatively, a second alternative mobile device may cognitively determine, according to a machine learning operation of learning behavior, patterns, and interactions between the second alternative mobile device and the contact information of mobile device "A", to permanently retain and/or continue to temporarily retain the contact information of mobile device "A."

Figure 4:
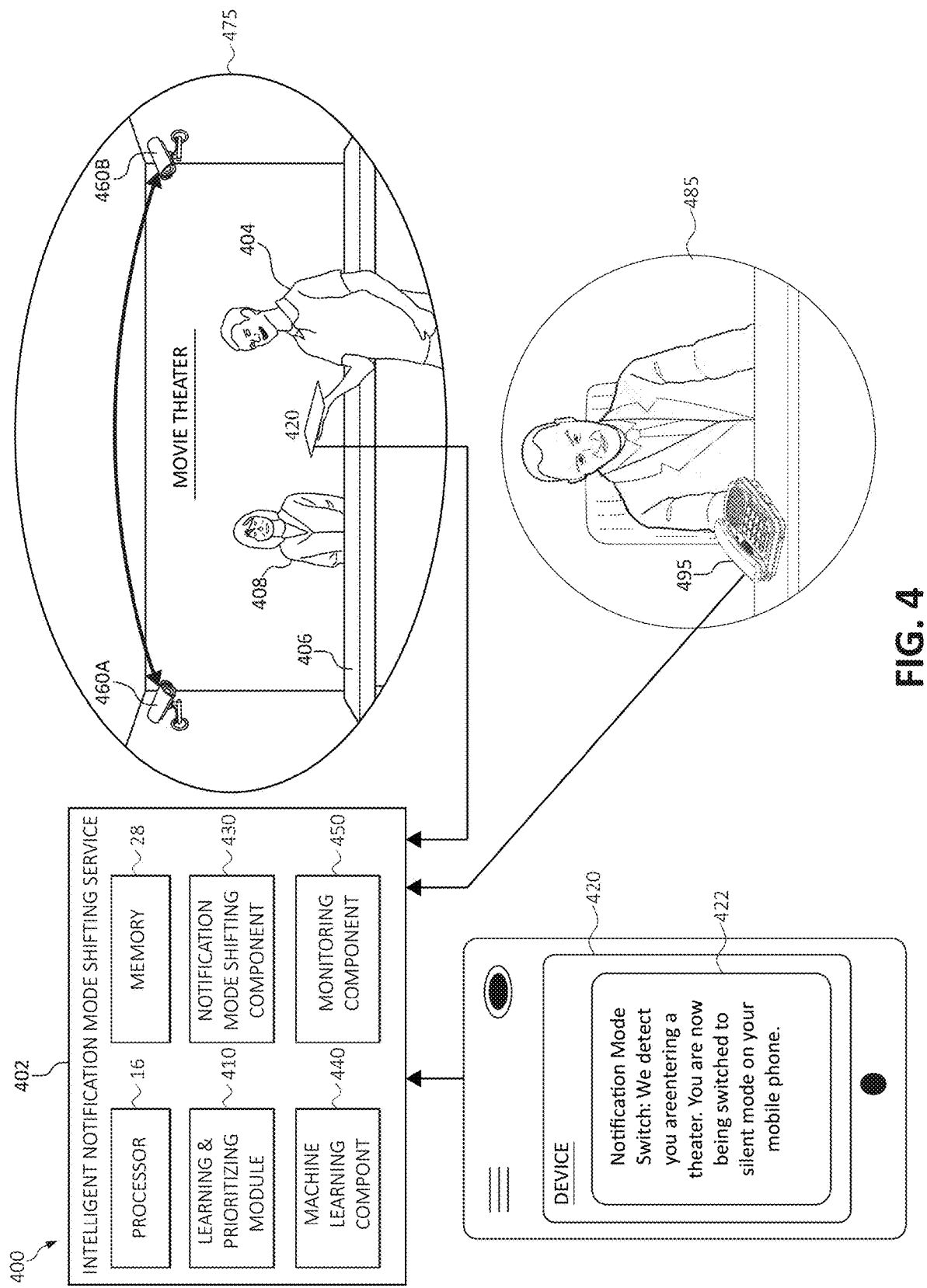
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 16 and memory 28 of FIG. 1 may be employed in FIG. 4 to perform various computational, data processing, storage and other functionality in accordance with various aspects of the present invention.

The functional components 400 may include intelligent notification mode shifting service 402 (or "IoT device customer satisfaction service 402"), having a learning and prioritization component 410, a notification mode shifting component 430, a machine learning component 440, and a monitoring component 450. (e.g., a knowledge database), each of which may work in communication with each other. In one aspect, computer device 12 of FIG. 1 may include intelligent notification mode shifting service 402.

The functional components 400 may include intelligent notification mode shifting service 402, having a learning and prioritization component 410, a notification mode shifting component 430, a machine learning component 440, and a monitoring component 450, each of which may work in communication with each other. In one aspect, computer device 12 of FIG. 1 may include intelligent notification mode shifting service 402.

The intelligent notification mode shifting service 402 may be in communication with one or more UEs such as for example, device 420 (e.g., a smart phone), a communication device 495 (e.g., a phone having a speaker function), one or more IoT devices, such as cameras 460A, 460B via one or more communication networks as described herein. Intelligent notification mode shifting service 402 may gather and collect collaborative data from each of the UEs and/or IoT devices, such as communication data from device 420 and 495 and images or videos from cameras 460A, 460B.

The learning and prioritization component 410 may cognitively learn and prioritize one or more parameters, events, and contextual information associated with a user. That is, the learning and prioritization module 410 may cognitively learn and prioritize the one or more parameters, events, and contextual information further by defining the one or more parameters, events, and contextual information to include calendar data, audio communications, video communications, text data, monitored communications of the user, historical data, user preferences, location-based dependencies, alerts, notifications, or a combination thereof. In another aspect, the learning and prioritization module 410 may cognitively learn and prioritize the one or more parameters, events, and contextual information further by determining one or more scheduled meetings at a selected time, one or more locations associated with the one or more scheduled meetings, a physical presence or absence of the user in the one or more locations, a virtual presence or absence of the user in the one or more locations, one or more contextual communications associated with the one or more UEs associated with the user, one or more policies or regulatory information affecting prioritization of the one or more parameters, events, and contextual information, or a combination thereof.

The learning and prioritization module 410 may collect the collaborative data and determine, using the monitoring component 450, a relationship between environment or physical stimuli and a physical, biological, and/or emotional reaction of a user 404, such as an interaction between the user 404 and user 408 (e.g., alternative person, employee, or other user) for purchasing movie tickets at a box office of a movie theater 475. Psychophysical measurements may be used to monitor and determine the user's 404 biometric data in relation to one or more parameters, events, and contextual information.

In association with the functionality of the learning and prioritization module 410, the monitoring component 450 may monitor the one or more parameters, events, and contextual information associated with the user and the one or more UEs.

In association with the functionality of the learning and prioritization module 410, the machine learning component 440 may also be initialized to learn or define the one or more parameters, events, contextual information.

The notification mode shifting component 430 may automatically switch and/or adjust one or more notification modes of one or more UEs such as, for example, device 420 or device 495 associated with the user according to the learning and prioritizing. The notification mode shifting component 430 may determine a notification mode for the one or more UEs such as, for example, device 420 or device 495 according to the one or more parameters, events, and contextual information. The notification mode may include a silent notification mode, an active notification mode (e.g., an audible or visual notification mode such as providing an audible ringer notification) a vibration mode, an airplane mode, and/or other defined notification mode. The notification mode shifting component 430 may cognitively switch and/or adjust the notification modes of the one or more UEs such as, for example, device 420 or device 495 linked to the user 404 according to a determined notification mode.

In an additional aspect, the notification mode shifting component 430 may cognitively switch notification modes of the one or more UEs such as, for example, device 420 or device 495 associated with the user 404 upon commencement of the one or more events and/or upon termination of the one or more events.

Consider now the following examples of a scheduled meeting in an office 485 or when attending a movie theater 475 using the functionality and components of FIG. 4. For example, the learning and prioritization component 410 may use the collaboration of data (which may be collected from UE's 420, 495 and/or IoT devices 460A-460B) for the defining and the determining as described herein. For example, the learning and prioritization component 410 may determine user 404 has a meeting scheduled for a certain date and time set in the user's calendar and/or is currently purchasing movie ticket to see a move in the movie theater 475. The user's meetings, locations, and contextual conversations (even transactions of purchasing movie tickets) are being monitored via the monitoring component 450 by the linked devices such as UE's 420 and 495 and IoT devices 460A-B.

The notification mode shifting component 430 may automatically switch the notification mode on the device 420 and/or 495 when the user 404 is engaged in a meeting using the device 495 or upon purchasing or entering a location such as, for example, the movie theater 475. That is, the notification mode shifting component 430 may automatically switch to a silent mode, vibration mode, and/or airplane mode on device 420 depending upon a defined level of importance or priority that may be defined or set by the user or that is automatically learned and set based on the history pattern, calendar calls, meetings, user behavior from the learning and prioritization component 410.

As soon as the meeting and/or the movie has completed (or upon the user 404 leaving the movie theater 475 or office 485, the notification mode shifting component 430 may perform an interrupt operation which interrupts the main processor of the device 420 or 495 to return to the notification mode (e.g., silent notification mode) to the previous notification mode (e.g., audible notification mode) where the user can be notified of one or more communication messages (e.g., a call, message, email, etc.) that may be defined, indicated, and/or learned as being important for the user.

In one aspect, the monitoring component 450, in association with the machine learning component 440, may monitor communication data (e.g., a conversation), media data (e.g., facial image or audio data), or text data using a natural language processing ("NLP") operation to monitor the communication data, media data, and/or text data at a particular point of time with a user 404 so as to determine the importance of the communication, media data, and/or text data based on tone, a topic being discussed, a type of event or setting, or combination thereof. Based on the priority of the communication (e.g., the scheduled conference call), media data, and/or text data, the notifications may be received by the user 404 as soon as the UE 420 and/or 485 automatically exits or switches from the silent notification mode, vibration notification mode, and/or the airplane notification mode. Based on the conversation of the meeting, location of the meeting, the UE can automatically switch between the different modes. In this way, there are no restrictions placed of merely fetching data from the calendar, but mechanisms of the illustrated embodiment may use the user's 404 metadata in terms of the person who is calling and categorizing whether the call is important to be taken at that particular point of time.

The learning and prioritization component 410, in association with the machine learning component 440, may apply one or more machine learning models to learn and prioritize one or more parameters, events, and contextual information such as, for example, psychophysical data, atmospheric data, environmental data, physical gestures of the user 404, an emotion of the user 404, speech of the user 404, facial gestures of the user 404, facial expressions of the user 404, biological data of the user 404, voice inflections and tones of the user 404, an interaction detected between the user 404 and an alternative person 408 (e.g., an employee, associate, and/or colleague), a service, product, person, or a combination thereof collected from the devices 420, device 495, and/or one or more IoT devices (e.g., camera devices 460A-460B).

The collected data may be used to calibrate by the machine learning component 440 each machine learning module to learn and understand various emotions, states, audible data, physiological movements and gestures, and/or biological data of a user. Once a machine learning model is calibrated and tuned by the machine learning component 440, the emotional state, mood, stress level, facial expression, speech patterns, voice tone, and/or body language, such as an angry or happy customer, expression less entities, etc., may be used and applied for determining customer satisfaction.

The notification mode shifting component 430 may provide one or more solutions for increasing the level of satisfaction upon learning, via the machine learning model, the root cause linking one or more of the plurality of satisfaction factors and levels to the collaboration of data. For example, the notification mode shifting component 430 may communicate a solution to one or more IoT devices in the system to enable the IoT device to perform an action relating to the solution.

The detection of the level of satisfaction (e.g., a level of a customer's mood) may be applied and used for the root cause analysis, such as temperature, allergen, air quality in case of living areas and food recipe, such as, for example, spicy, sweet, sour, and the like. The level of satisfaction (e.g., a detection of a user's mood) may be associated with using a semantic analysis, as well as cluster based pattern matching operation, to identify an actual cause leading to a current satisfaction of dissatisfaction level.

In one aspect, the notification mode shifting component 430 may communicate a notification to a graphical user interface (GUI) 422 of a computing device or mobile such as, for example UE 420. For example, the notification mode shifting component 430 may communicate an alert to a display screen of a computer or mobile device, for example, "Notification Mode Switch: We detect you are entering a theater. You are now being switched to silent notification mode (e.g., silent mode) on your mobile device."

In one aspect, a knowledge domain may be used in association with the learning and prioritizing component 410. For example, the learning and prioritizing component 410 and the monitoring component 450 may parse through a knowledge domain having an ontology of one or more parameters, events, and contextual information according to communication data, collected or historical data, various types of emotions and stimuli that produce the emotions, speech patterns, facial gestures, facial expressions, biological data, voice inflections and tones, an interaction detected between the customer and a service, product, or person, emotional state, mood, stress level, and/or body language, or a combination thereof to assist the IoT devices in improving the customer experience and satisfaction in a service based industry using the mixed types of IoT devices in the IoT network.

A thesaurus or ontology may be used as the domain knowledge of the learning and prioritizing component 410 and the monitoring component 450 and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to physical phenomena, atmospheric, biological, physiological, environmental, scientific, industrial, educational, statistical data, medical, commercial, health, manufacturer information, biomedical-specific information, one or more stimuli and response types in a variety of applications, physical gestures of a user, various types of emotions and stimuli that produce the various emotions, speech patterns, facial gestures, facial expressions, biological data, voice inflections and tones, an interaction detected between the customer and a service, product, or person. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

The intelligent notification mode shifting service 402 (in association with the machine learning component) may include using one or more heuristics and machine learning based models for performing one or more of the various aspects as described herein. In one aspect, the intelligent notification mode shifting service 402 and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous user systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

Figure 5:
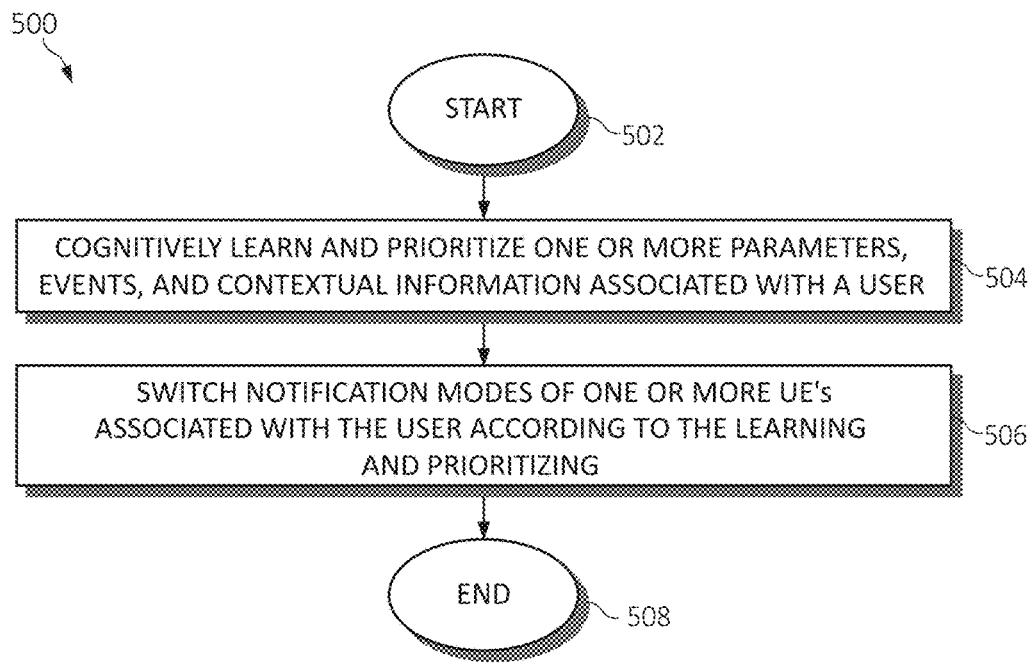
FIG. 5 is a flowchart diagram depicting an exemplary method for intelligent notification mode switching in user equipment (UE), again in which various aspects of the present invention may be realized.

Turning now to FIG. 5, a method 500 for intelligent notification mode switching in one or more UEs by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium.

The functionality 500 may start in block 502. One or more parameters, events, and contextual information associated with a user may be cognitively learned and prioritized, as in block 504. A notification mode of one or more UEs (e.g., user equipment) associated with the user may be switched according to the learning and prioritizing, as in block 506. The functionality may end, as in block 508.

Figure 6:
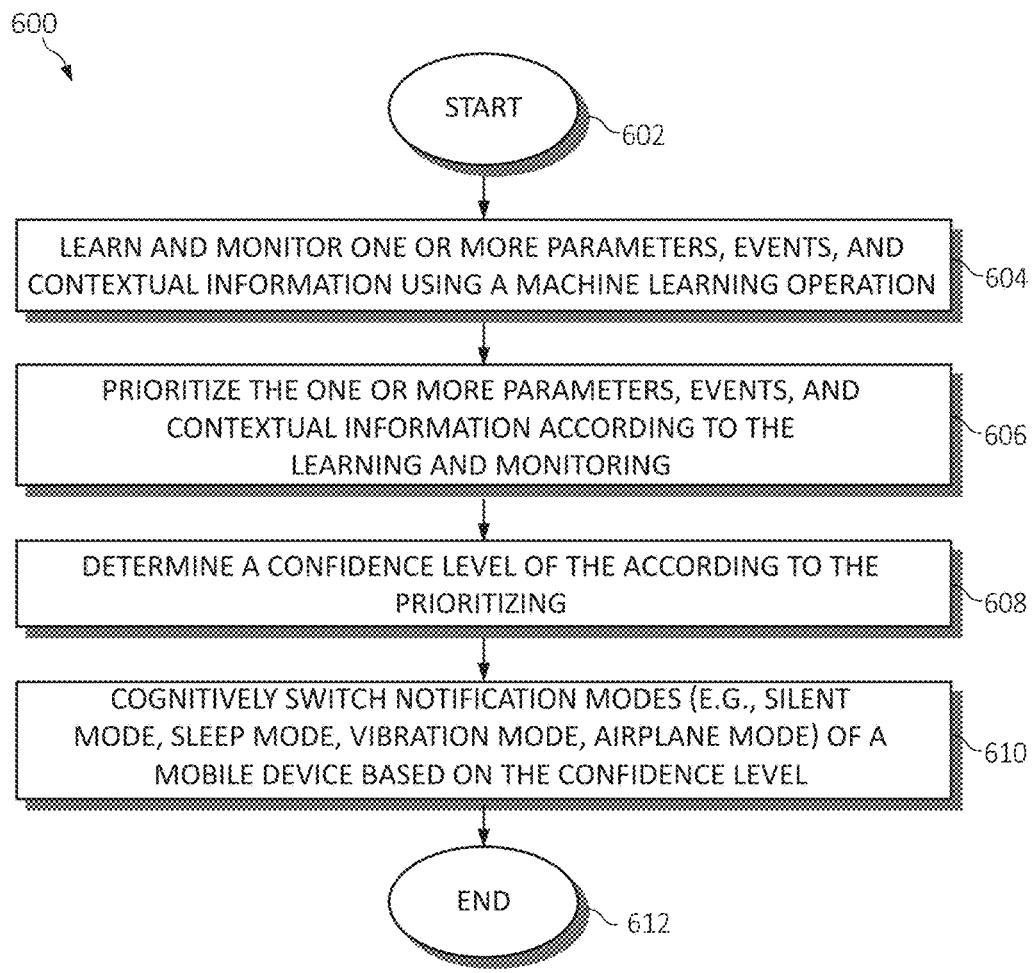
FIG. 6 is a flowchart diagram depicting an additional exemplary method for intelligent notification mode switching in a mobile device, again in which various aspects of the present invention may be realized.

Turning now to FIG. 6, an additional method 600 for intelligent notification mode switching in a wireless communication device or "mobile device" (e.g., smartphone, tablet, computer, etc.) by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium.

The functionality 600 may start in block 602. One or more parameters, events, and contextual information may be learned and monitored using a machine learning operation, as in block 604. The one or more parameters, events, and contextual information may be prioritized according to the learning and monitoring, as in block 606. A confidence level according to the prioritizing, as in block 608. A notification mode (e.g., silent mode, sleep mode, vibration mode, airplane mode) of a mobile device may be cognitively switched based on the confidence level, as in block 610. The functionality may end, as in block 612.

In one aspect, in conjunction with and/or as part of at least one block of FIGS. 5-6, the operations of 500 and/or 600 may include each of the following. The operations of 500 and/or 600 may trigger the temporary exchange of the contact data between a first UE (e.g., mobile device) and the second UE by tapping the first UE with the second UE using near field communication (NFC). A temporary ad-hoc network of a plurality of UE's may be created for one or more users in a cloud computing environment for providing the temporary exchange of the contact data. The operations of 500 and/or 600 may automatically delete the contact data on the first UE, the second UE, or a combination thereof upon the first UE or the second UE exiting a defined network location, and/or automatically delete the contact data on the first UE, the second UE, or a combination thereof according to an expiration of a predetermined time period. A machine learning component may be initialized to learn or define the one or more policies, the user preferences, the historical data, and the defined physical or virtual proximity between the first UE and the second UE.

The operations of 500 and/or 600 may dynamically revoke, reinstate, or reauthorize the temporary exchange of the contact data the first UE and the second UE according to the one or more policies, the user preferences, the historical data, the defined physical or virtual proximity between the first UE and the second UE, or a combination thereof. Additionally, the operations of 500 and/or 600 may enable a user to select, on one or more UE, to permanently retain the contact data on the first UE, the second UE, or a combination thereof according to the one or more policies, the user preferences, the historical data, the defined physical or virtual proximity between the first UE and the second UE, or a combination thereof.

Figure 7:
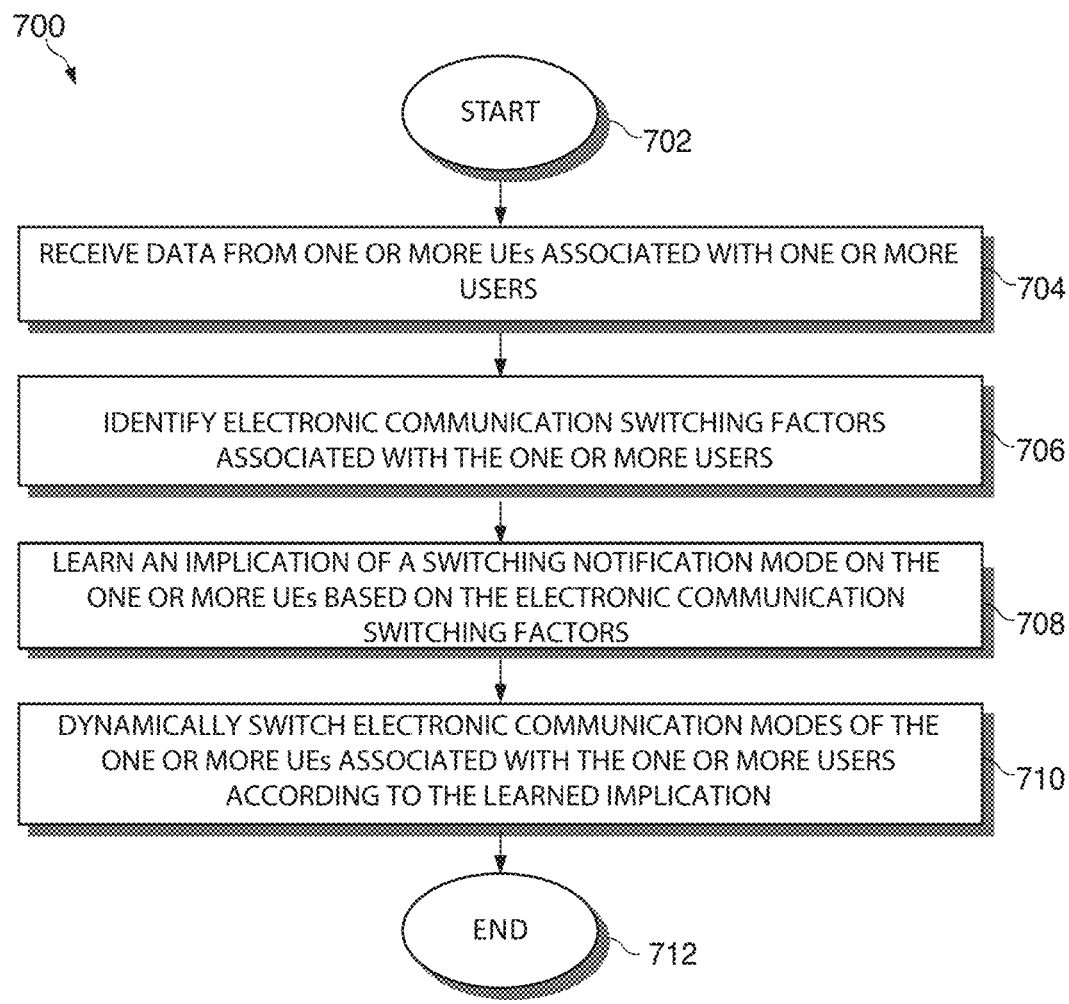
FIG. 7 is a flowchart diagram depicting an additional exemplary method for intelligent notification mode switching in a mobile device, again in which various aspects of the present invention may be realized.

Turning now to FIG. 7, an additional method 700 for intelligent notification mode switching in a wireless communication device or "mobile device" (e.g., smartphone, tablet, computer, etc.) by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium.

The functionality 700 may start in block 702. Data may be received from one or more UEs associated with one or more users, as in block 704. Electronic communication switching factors associated with the one or more users may be identified, as in block 706. An implication of a switching notification mode on the one or more UEs based on the electronic communication switching factors may be learned, as in block 708. An electronic communication modes of the one or more UEs associated with the one or more users may be cognitively switched according to the learned implication, as in block 710. The functionality may end, as in block 712.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent notification mode switching in user equipment (UE) by a processor, comprising:
   receiving data on one or more UEs associated with one or more users;
   identifying electronic communication switching factors associated with the one or more users;
   learning an implication of a switching notification mode on the one or more UEs based on the electronic communication switching factors, wherein the identifying of the electronic communication switching factors includes analyzing facial gestures of the one or more users and contextual conversations between the one or more users and an alternative user obtained from a device external to the one or more UEs, and wherein learning the implication includes identifying an indirect sub-factor influencing the implication of the switching notification mode, and determining that the switching notification mode of the one or more UEs conflicts with the indirect sub-factor; and
   dynamically switching electronic communication modes of the one or more UEs associated with the one or more users according to the learned implication, wherein, in conjunction with dynamically switching the electronic communication modes, a notification is generated by the one or more UEs indicative of an explanation of the learned implication.

2. The method of claim 1, wherein identifying the electronic communication switching factors further includes defining one or more parameters, events, and contextual information to include calendar data, audio communications, video communications, text data, monitored communications of the one or more users, historical data, user preferences, location-based dependencies, alerts, notifications, or a combination thereof.

3. The method of claim 1, wherein identifying the electronic communication switching factors further includes determining one or more scheduled meetings at a selected time, one or more locations associated with the one or more scheduled meetings, a physical presence or absence of the one or more users in the one or more locations, a virtual presence or absence of the one or more users in the one or more locations, one or more contextual communications associated with the one or more UEs associated with the one or more users, one or more policies or regulatory information affecting prioritization of the one or more parameters, events, and contextual information, or a combination thereof.

4. The method of claim 1, further including monitoring the electronic communication switching factors associated with the one or more users and the one or more UEs.

5. The method of claim 1, further including initializing a machine learning component to learn or define the electronic communication switching factors.

6. The method of claim 1, further including:
   determining the switching notification mode for the one or more UEs according to the electronic communication switching factors, wherein the switching notification mode includes a silent notification mode, an audible notification mode, a vibration mode, an airplane mode; and
   cognitively switching the electronic communication modes of the one or more UEs linked to the user according to the determined switching notification mode.

7. The method of claim 1, further including:
   cognitively switching the electronic communication modes of the one or more UEs associated with the one or more users upon commencement of the one or more events; or
   cognitively switching the electronic communication modes of the one or more UEs associated with the one or more users upon termination of the one or more events.

8. A system for intelligent notification mode switching in user equipment (UE), comprising:
   one or more computers with executable instructions that when executed cause the system to:
   receive data on one or more UEs associated with one or more users;
   identify electronic communication switching factors associated with the one or more users;
   learn an implication of a switching notification mode on the one or more UEs based on the electronic communication switching factors, wherein the identifying of the electronic communication switching factors includes analyzing facial gestures of the one or more users and contextual conversations between the one or more users and an alternative user obtained from a device external to the one or more UEs, and wherein learning the implication includes identifying an indirect sub-factor influencing the implication of the switching notification mode, and determining that the switching notification mode of the one or more UEs conflicts with the indirect sub-factor; and
   dynamically switch electronic communication modes of the one or more UEs associated with the one or more users according to the learned implication, wherein, in conjunction with dynamically switching the electronic communication modes, a notification is generated by the one or more UEs indicative of an explanation of the learned implication.

9. The system of claim 8, wherein identifying the electronic communication switching factors further define one or more parameters, events, and contextual information to include calendar data, audio communications, video communications, text data, monitored communications of the one or more users, historical data, user preferences, location-based dependencies, alerts, notifications, or a combination thereof.

10. The system of claim 8, wherein identifying the electronic communication switching factors further determine one or more scheduled meetings at a selected time, one or more locations associated with the one or more scheduled meetings, a physical presence or absence of the one or more users in the one or more locations, a virtual presence or absence of the one or more users in the one or more locations, one or more contextual communications associated with the one or more UEs associated with the one or more users, one or more policies or regulatory information affecting prioritization of the one or more parameters, events, and contextual information, or a combination thereof.

11. The system of claim 8, wherein the executable instructions further monitor the electronic communication switching factors associated with the one or more users and the one or more UEs.

12. The system of claim 8, wherein the executable instructions further initialize a machine learning component to learn or define the electronic communication switching factors.

13. The system of claim 8, wherein the executable instructions further:
determine the switching notification mode for the one or more UEs according to the electronic communication switching factors, wherein the switching notification mode includes a silent notification mode, an audible notification mode, a vibration mode, an airplane mode; and
cognitively switch the electronic communication modes of the one or more UEs linked to the one or more users according to the determined switching notification mode.

14. The system of claim 8, wherein the executable instructions further:
cognitively switch the electronic communication modes of the one or more UEs associated with the one or more users upon commencement of the one or more events; or
cognitively switch the electronic communication modes of the one or more UEs associated with the one or more users upon termination of the one or more events.

15. A computer program product for intelligent notification mode switching in one or more users equipment (UE) by a processor, the computer program product comprising a non-transitory computer-readable storage medium having computer-readable program code portions stored therein, the computer-readable program code portions comprising:
an executable portion that receives data on one or more UEs associated with one or more users;
an executable portion that identifies electronic communication switching factors associated with the one or more users;
an executable portion that learns an implication of a switching notification mode on the one or more UEs based on the electronic communication switching factors, wherein the identifying of the electronic communication switching factors includes analyzing facial gestures of the one or more users and contextual conversations between the one or more users and an alternative user obtained from a device external to the one or more UEs, and wherein learning the implication includes identifying an indirect sub-factor influencing the implication of the switching notification mode, and determining that the switching notification mode of the one or more UEs conflicts with the indirect sub-factor; and
an executable portion that dynamically switches electronic communication modes of the one or more UEs associated with the one or more users according to the learned implication, wherein, in conjunction with dynamically switching the electronic communication modes, a notification is generated by the one or more UEs indicative of an explanation of the learned implication.

16. The computer program product of claim 15, wherein the executable portion that identifies the electronic communication switching factors further defines one or more parameters, events, and contextual information to include calendar data, audio communications, video communications, text data, monitored communications of the one or more users, historical data, user preferences, location-based dependencies, alerts, notifications, or a combination thereof.

17. The computer program product of claim 15, wherein the executable portion that identifies the electronic communication switching factors further determines one or more scheduled meetings at a selected time, one or more locations associated with the one or more scheduled meetings, a physical presence or absence of the one or more users in the one or more locations, a virtual presence or absence of the one or more users in the one or more locations, one or more contextual communications associated with the one or more UEs associated with the one or more users, one or more policies or regulatory information affecting prioritization of the one or more parameters, events, and contextual information, or a combination thereof.

18. The computer program product of claim 15, further including an executable portion that:
monitors the electronic communication switching factors associated with the one or more users and the one or more UEs; and
initializes a machine learning component to learn or define the one or more parameters, events, contextual information.

19. The computer program product of claim 15, further including an executable portion that:
determines the switching notification mode for the one or more UEs according to the electronic communication switching factors, wherein the switching notification mode includes a silent notification mode, an audible notification mode, a vibration mode, an airplane mode; and
cognitively switches the electronic communication modes of the one or more UEs linked to the one or more users according to the determined switching notification mode.

20. The computer program product of claim 15, further including an executable portion that:
cognitively switches notification modes of the one or more UEs associated with the one or more users upon commencement of the one or more events; or cognitively switches notification modes of the one or more UEs associated with the one or more users upon termination of the one or more events.

* * * * *